United States Patent
Thompson et al.

(10) Patent No.: US 6,610,420 B2
(45) Date of Patent: Aug. 26, 2003

(54) THERMAL BARRIER COATING SYSTEM OF A TURBINE ENGINE COMPONENT

(75) Inventors: Anthony Mark Thompson, Niskayuna, NY (US); Wayne Charles Hasz, Pownal, VT (US)

(73) Assignee: General Electric Company, Niskayuna, NY (US)

(*) Notice: Subject to any disclaimer, the term of this patent is extended or adjusted under 35 U.S.C. 154(b) by 6 days.

(21) Appl. No.: 10/016,635

(22) Filed: Oct. 30, 2001

(65) Prior Publication Data

US 2003/0008166 A1 Jan. 9, 2003

Related U.S. Application Data

(62) Division of application No. 09/407,495, filed on Sep. 28, 1999, now Pat. No. 6,368,672.

(51) Int. Cl.[7] .............................. B32B 15/04; F03B 3/12
(52) U.S. Cl. ...................... 428/633; 428/621; 428/652; 428/653; 428/680; 428/678; 428/632; 416/241 R
(58) Field of Search .................................. 428/621, 633, 428/652, 653, 678, 680, 632; 416/241 R, 241 B

(56) References Cited

U.S. PATENT DOCUMENTS

| 5,384,200 A | 1/1995 | Giles et al. |
| 6,210,812 B1 * | 4/2001 | Hasz et al. |
| 6,346,134 B1 * | 2/2002 | Russo et al. |

* cited by examiner

*Primary Examiner*—Deborah Jones
*Assistant Examiner*—Jennifer McNeil
(74) *Attorney, Agent, or Firm*—Robert P. Santandrea; Noreen C. Johnson

(57) ABSTRACT

A method for forming a thermal barrier coating system on a turbine engine component includes forming a bondcoat on the turbine engine component and depositing a thermal barrier coating so as to overlie the bondcoat. The bondcoat is formed by thermally co-spraying first and second distinct alloy powders on the turbine engine component forming an oxidation-resistant region, and thermally spraying a third alloy powder on the oxidation-resistant region to form a bonding region. The oxidation-resistant region is more resistant to oxidation than the bonding region

12 Claims, 2 Drawing Sheets

THERMAL BARRIER COATING SYSTEM OF A TURBINE ENGINE COMPONENT

This is a division of application Ser. No. 09/407,495, filed Sep. 28, 1999 now U.S. Pat. No. 6,368,672.

BACKGROUND OF THE INVENTION

The invention relates generally to thermal barrier coating systems, in particular, thermal barrier coating systems exposed to high temperatures such as in a gas turbine engine.

Higher operating temperatures for gas turbine engines have been continuously sought in the art in order to improve the operating efficiency of the engine. However, as operating temperatures are raised, the high temperature capabilities of the components in the engine must also increase. To this end, various nickel-base and cobalt-base superalloys have been employed, which incorporate oxidation-resistant and corrosion-resistant overlay and diffusion-type coatings.

Further improvements in the high temperature capabilities of components have been realized by coating engine components with a thermal barrier coating (TBC), in addition to the overlay and diffusion-type coatings mentioned above. TBCs are generally formed of ceramic materials, such as zirconia ($ZrO_2$) stabilized by an oxide material. To promote adhesion between the thermal barrier coating and the underlying substrate, bond coats are utilized. One type of bond coat is formed of MCrAlY, wherein M is chosen from the group consisting of iron, cobalt, nickel and combinations thereof.

Such bond coats may be deposited thermal spray techniques, including low pressure plasma spray (LPPS), High Velocity-Oxy Fuel (HVOF), and air plasma spray (APS). Of these bond coats, APS bond coats have been used for their ease of deposition and bond quality and integrity between the substrate and the TBC. However, a need exists in the art for further improved bondcoats of a thermal barrier coating system. Such bondcoats should be easily deposited, have improved oxidation and/or corrosion-resistance, and provide a good adhesive interface for the overlying thermal barrier coating.

BRIEF SUMMARY OF THE INVENTION

In one embodiment of the present invention, a method for forming a thermal barrier coating system on a turbine engine component is provided. The method includes forming a bondcoat on the turbine engine component by thermally co-spraying first and second distinct alloy powders on the turbine engine component, to form an oxidation-resistant region. Then, a bonding region is provided by thermally spraying a third alloy powder on the oxidation-resistant region. The oxidation-resistant region is more resistant to oxidation than the bonding region. A thermal barrier coating is then deposited so as to overlie the bondcoat.

In another embodiment of the present invention, a turbine engine component is provided. The component includes a substrate, and a bondcoat overlying the substrate. The bondcoat has an oxidation-resistant region, and a bonding region overlying the oxidation-resistant region, wherein the oxidation-resistant region is more resistant to oxidation than the bonding region. A thermal barrier coating overlies the bondcoat.

DETAILED DESCRIPTION OF THE INVENTION

Figure 1:
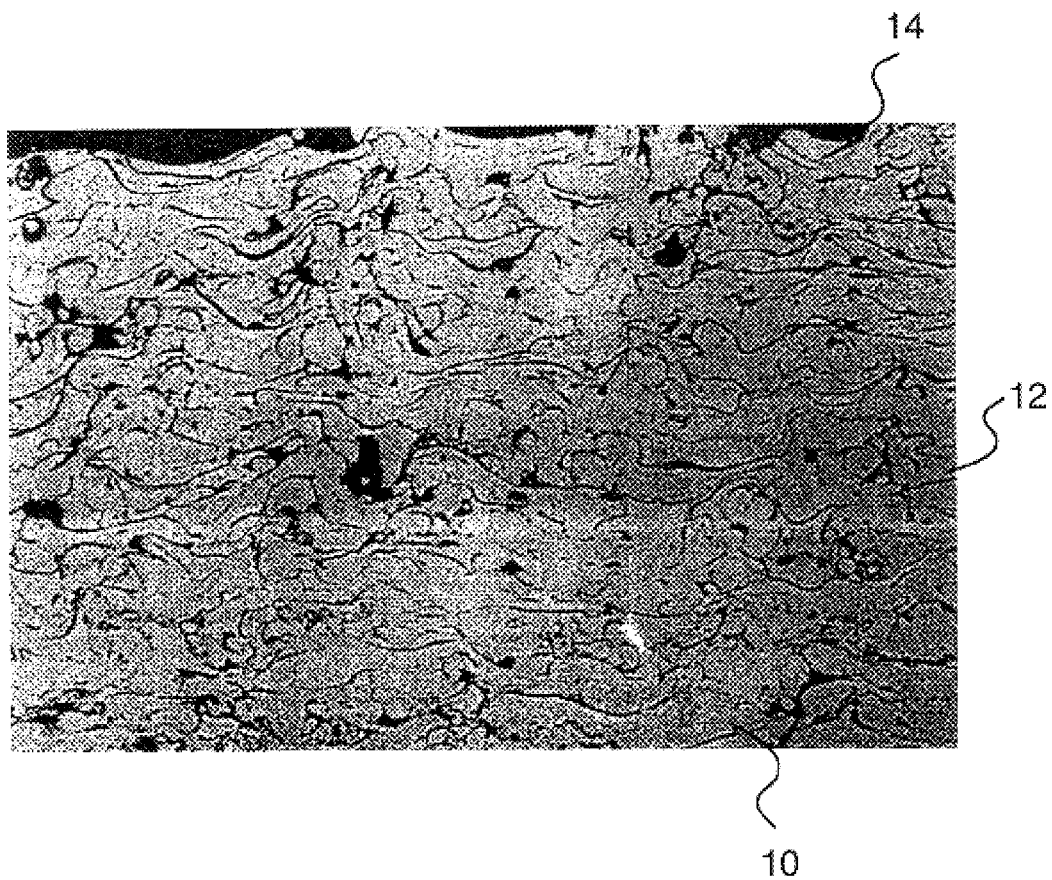
FIG. 1 is a cross-sectional photomicrograph of an example of a thermal barrier coating system on a substrate, before heat cycling.

According to an embodiment of the present invention, a substrate, generally in the form of a turbine engine component is treated so as to improve its high temperature performance, such as at temperatures above 1000° C. The substrate is typically formed of a superalloy material, known for high temperature performance in terms of tensile strength, creep resistance, oxidation resistance, and corrosion resistance, for example. The superalloy component is typically formed of a nickel-base or a cobalt-base alloy, wherein nickel or cobalt is the single greatest element in the superalloy by weight. Illustrative nickel-base superalloys include at least about 40 wt % Ni, and at least one component from the group consisting of cobalt, chromium, aluminum, tungsten, molybdenum, titanium, and iron. Examples of nickel-base superalloys are designated by the trade names Inconel®, Nimonic®, Rene® (e.g., Rene® 80-, Rene® 95, Rene® 142, and Rene® N5alloys), and Udimet®, and include directionally solidified and single crystal superalloys. Illustrative cobalt-base superalloys include at least about 30 wt % Co, and at least one component from the group consisting of nickel, chromium, aluminum, tungsten, molybdenum, titanium, and iron. Examples of cobalt-base superalloys are designated by the trade names Haynes®, Nozzaloy®, Stellite® and Ultimet®. The actual configuration of a substrate may vary widely, such as in the form of a combustor liner, combustor dome, shroud, bucket or blade, nozzle or vane. Blades are a typical application of TBC systems according to embodiments of the present invention.

According to embodiments of the present invention, a bond coat is deposited by thermal spraying on the substrate. As used herein, thermal spraying includes flame spraying, HVOF (high-velocity oxy-fuel) spraying, plasma spraying, and wire arc spraying. Plasma spraying includes air plasma spraying (APS), and low pressure plasma spraying (LPPS), also known as vacuum plasma spraying (VPS). For ease of application and for reasons discussed hereinafter, air plasma spraying (APS) is generally used to deposit the bond coat according to embodiments of the present invention.

The bondcoat contains at least two regions, including an oxidation-resistant region and a bonding region that overlies the oxidation-resistant region. The oxidation-resistant region protects the underlying substrate from oxidation and/or corrosive attack during actual use. While the bonding region can offer a certain degree of oxidation resistance, it has less resistance to oxidation than the oxidation-resistance region. The bonding region provides a compliance match and high surface area bonding interface to provide strong adhesion of the overlying thermal barrier coating thereto.

The oxidation resistant region is formed by thermally co-spraying two distinct alloys, in powder form. Typically, a first alloy for the oxidation-resistant region is nickel- or cobalt-based, such as those already used for conventional bondcoats known by the general composition MCrALY, wherein M is an element selected from the group consisting of nickel, cobalt and combinations thereof.

According to a particular development of the present invention, the second alloy is effective to modify the oxidation characteristics of the material deposited by thermal spraying, and oxidation of the underlying substrate. The second alloy is believed to modify the deposited material and/or substrate either chemically or physically. In one embodiment, the alloy contains silicon, which believed to be effective to retard oxidation of not only the oxidation-resistant region itself, but also to retard oxidation of the underlying substrate.

The second alloy generally also modifies the oxidation-resistant region physically by increasing the density thereof, such as by a subsequent heat treatment at an elevated temperature after thermal spraying. While the heat treatment is carried out after thermal spraying, it need not follow immediately. For example, heat treatment can by carried out as part of a heat treatment step for the thermal barrier coating or substrate, such as known heat treatment processes for vertically microcracked TBC's or superalloy components. The second alloy typically either melts thereby filling the voids within the thermally sprayed material, or functions to increase the intrinsic densification rate of the alloy of the first powder, such as by liquid or solid phase sintering. In yet another form, the heat treatment may be effected to produce an alloy in the oxidation-resistant region that has a generally uniform composition, which composition has desirable oxidation and/or corrosion resistance. In this embodiment, the uniform composition can be achieved by annealing, either by solid- or liquid-state interdiffusion of the alloy components during heat treatment.

While densification of the thermally sprayed material is desired, it is not essential that full densification be achieved. Rather, slight increases in densification in the deposited material may be effective to decrease the degree of connectivity of voids (open porosity) present in the material, and hence, susceptibility of the underlying substrate to oxidation or corrosion. Slight densification is generally envisioned as 'pinching-off' the voids thereby producing "closed porosity". Indeed, as discussed below in connection with a particular example, no substantial densification was visually observed by cross-sectional photomicrographs, but significant improvements in the degree of oxidation of the underlying substrate were nevertheless observed.

Typically, the first alloy is formed of a homogeneous superalloy composition such as MCrAlY, wherein M is selected from a group consisting of iron, cobalt, nickel and combinations thereof. In one particular embodiment, the alloy is nickel-based (i.e. M is nickel), and is identified by the vendor designation Ni211, from Praxair. Ni211 has a nominal composition 22.0 Cr, 10.0 Al, 1.0 Y, balance Ni (all in weight percent).

In one embodiment, the second alloy is a superalloy braze alloy. The braze alloy composition typically contains one or more components for lowering the melting point of the thereof. Melting point suppressants for nickel-base and cobalt-base braze alloys include silicon, boron, phosphorous, or combinations thereof. Preferably, the melting point suppressant is one of silicon or boron, or a combination thereof. In one particular embodiment, the braze alloy contains nickel, chrome and silicon, such as alloy composition no. 5 below. Exemplary nickel-base braze alloy compositions include the following (components are designated in weight %):

| 1. | 4.5 Si, 14.5 Cr, 3.3 B, and 4.5 Fe, balance Ni; |
| 2. | 15 Cr, 3.5 B, balance Ni; |
| 3. | 4.5 Si, 3 B, balance Ni; |
| 4. | 4.2 Si, 7 Cr, 3 B, 3 Fe, balance Ni; |
| 5. | 10 Si, 19 Cr, balance Ni; |

-continued

| 6. | 3.5 Si, 22 Co, 2.8 B, balance Ni; |
| 7. | 3.5 Si, 1.8 B, balance Ni; |
| 8. | 4.5 Si, 14 Cr, 3 B, 4.5 Fe, balance Ni; |
| 9. | 17 Cr, 9 Si, 0.1 B, balance Ni; |
| 10. | 2.6 Si, 2 Cr, 2 B, 1 Fe, balance Ni; |
| 11. | 15 Cr, 8 Si, balance Ni; |
| 12. | 7 Cr, 3 Fe, 4 Si, 3 B, balance Ni. |

Other nickel-base braze alloy compositions include:

| 12. | 10.1 Si, 19.0 Cr, balance Ni; |
| 13. | 4.5 Fe, 4.5 Si, 14.0 Cr, 3.1 B, 0.75 C, balance Ni; |
| 14. | 4.5 Fe, 4.5 Si, 14.0 Cr, 3.1 B, balance Ni; |
| 15. | 4.5 Si, 3.1 B, balance Ni; |
| 16. | 11.0 P, balance Ni; and |
| 17. | 10.1 P, 14.0 Cr, balance Ni. |

Cobalt-base braze alloy compositions include:

| 1. | 8 Si, 19 Cr, 17 Ni, 4 W, 0.8 B, balance Co |
| 2. | 17.0 Ni, 1.0 Fe, 8.0 Si, 19.0 Cr, 0.8 B, 0.4 C, balance Co; |
| 3. | 23.5 Cr, 10 Ni, 7 W, 3.5 Ta, 2.9 B, 0.2 Ti, balance Co; |
| 4. | 22 Cr, 22 Ni, 14.5 W, 0.35 Si, 2.3 B, balance Co; |

Following co-spraying to form the oxidation-resistance region, thermal spraying is executed to form the bonding region that overlies the oxidation resistant region. The bonding region generally differs from the oxidation-resistant region by having a structure that promotes adhesion between the overlying thermal barrier coating (TBC), rather than oxidation or corrosion resistance. The bonding region is formed by thermally spraying a third alloy, in powder form. Typically, the third alloy is an MCrAlY alloy, wherein M is selected from a group consisting of iron, cobalt, nickel and combinations thereof. The third alloy is advantageously the same alloy as that of the first alloy. In one particular embodiment, the third alloy is nickel-based (i.e. M is nickel), and is identified by the vendor designation Ni211, from Praxair. Ni211 has a nominal composition 67.0 Ni, 22.0 Cr, 10.0 Al, and 1.0 Y, all in weight percent.

The transition from depositing the oxidation-resistant region to the bonding region is typically stepwise, whereby the feed of a mixture of the first and second powders is halted, feed of the third powder is initiated, and thermal spaying is then continued. This technique results in a bilayer bondcoat, each region being in the form of a distinct layer, which can be distinguished from each other by location of chemical species, as well as concentration of oxide material after furnace cycle testing or after actual use. Alternatively, the transition in thermal spraying may be made gradually, forming a bondcoat that is graded. Here, the first and second powders are deposited, and the ratio of the two is changed such that feed of the second powder is gradually eliminated, forming an overlying region that is principally formed of the first alloy (such as MCrAlY). The bondcoat typically has a thickness within a range of about 25 microns to about 750 microns, such as about 100 microns to about 400 microns.

Following thermal spraying and prior to any further heat treatment steps, such as heat treatment for densification and/or annealing, the oxidation-resistant region typically has two main phases, including a first phase corresponding to the first alloy and a second phase corresponding to the second alloy. The two phases generally correspond to the respective compositions of the two initial powders. Following a further heat treatment step, the level and morphology of the porosity in the oxidation-resistance region is typically modified, although significant increases in density may not be essential to achieve the desired improvement in oxidation resistance or substrate protection. That is, reducing the degree of connectivity of the porosity may be effective to decrease the availability of the substrate to oxidation and/or corrosion. Post heat treatment, the oxidation-resistant region typically has one of several microstructures, including an interconnected matrix phase in which the first phase is dispersed, the first phase and an intergranular second phase, or a homogeneous composition brought about by interdiffusion of the first and second phases.

Subsequently, a thermal barrier coating (TBC) is deposited on the bond coat, generally directly contacting the bonding region of the bondcoat. The thermal barrier coating is formed of a ceramic material such as zirconia, stabilized with at least one oxide, including yttria ($Y_2O_3$), ceria ($CeO_2$), magnesia (MgO), scandia ($Sc_2O_3$), and calcia. In one particular embodiment, the thermal barrier coating is formed of yttria stabilized zirconia. The thermal barrier coating is generally deposited by one of several techniques such as by a thermal spray technique, including high-velocity oxy-fuel (HVOF) and plasma spray techniques. Plasma spray techniques include air plasma spray (APS), vacuum plasma spray (VPS), and low-pressure plasma spray (LPPS). Alternatively, vapor deposition techniques, such as electron beam physical vapor deposition (EBPVD) can be utilized. For ease of application and for manufacturing consideration, air plasma spray is preferably used. The thermal barrier coating typically has a thickness on the order of about 50 microns to about 2500 microns, such as about 75 microns to about 1250 microns. Typically, the thickness of the bond coat was less than about 500 microns, such as 400 microns.

According to a development of the present invention, the bondcoat formed according to the techniques described above has both superior oxidation-resistance and superior bonding adhesion to the overlying thermal barrier coating. Particularly, by using a mixture of alloys for the first deposited material, an oxidation-resistant region is formed that a level of oxidation resistance normally associated with processes that form intrinsically more dense layers, such as vacuum plasma spray (VPS) and high-velocity oxy-fuel (HVOF) techniques. By using a third alloy, such as an MCrAlY alloy alone (i.e., without an oxidation-resistance enhancing component), the bonding region is made porous, providing a superior bonding interface to the overlying thermal barrier coating. In addition, the porous nature of the bonding region permits some degree of internal oxidation thereby providing a level of compliance to accommodate thermal expansion and contraction of the overlying thermal barrier coating.

EXAMPLE

A Rene® N5 substrate in the form of a 1 inch diameter test coupon was coated. A Metco 7MB plasma spray torch was placed about 5 inches from the test coupon, and a mixture Ni211 powder (−140+325 mesh) and braze alloy (−140+325 mesh) was fed to the torch. The mixture contained a 25/75 wt % mixture of Ni211 powder/braze alloy powder. The torch current was set at 500 A to form a 5 mil thick oxidation resistant region. Air plasma spraying was stopped, and Ni211 (−325 mesh) was then fed to the torch without any braze alloy. Again the torch current was set to 500 A, to form a 10 mil thick bonding region. The thermal barrier coating system was completed with an air plasma sprayed thermal barrier coating, having a thickness of 20 mils. The coupon was then subjected to a heat treatment step, in vacuum for 30 minutes at 2150° F.

The resulting structure is shown in FIG. 1. As illustrated, the photomicrograph shows a substrate 10, the bondcoat 12, and the thermal barrier coating 14. The oxidation-resistant region and the bonding region are largely indistinguishable from each other, but can be more clearly distinguished with a microprobe plot showing the distribution of chemical species. Due to the deposition technique by APS, 'splat' lines are present in the deposited layer. In the air plasma spray process, the powders are melted and accelerated through ambient air towards the substrate. Upon striking the substrate, the molten alloy droplets are flattened and solidify. The deposited material has a layered structure, composed of areas of solidified alloy with interfacial regions, splat lines, which may contain some oxide and porosity. While it is believed that the oxidation-resistant region is densified to some extent so as to alter the nature of the porosity, marked densification from the heat treatment step was not observed.

Figure 2:
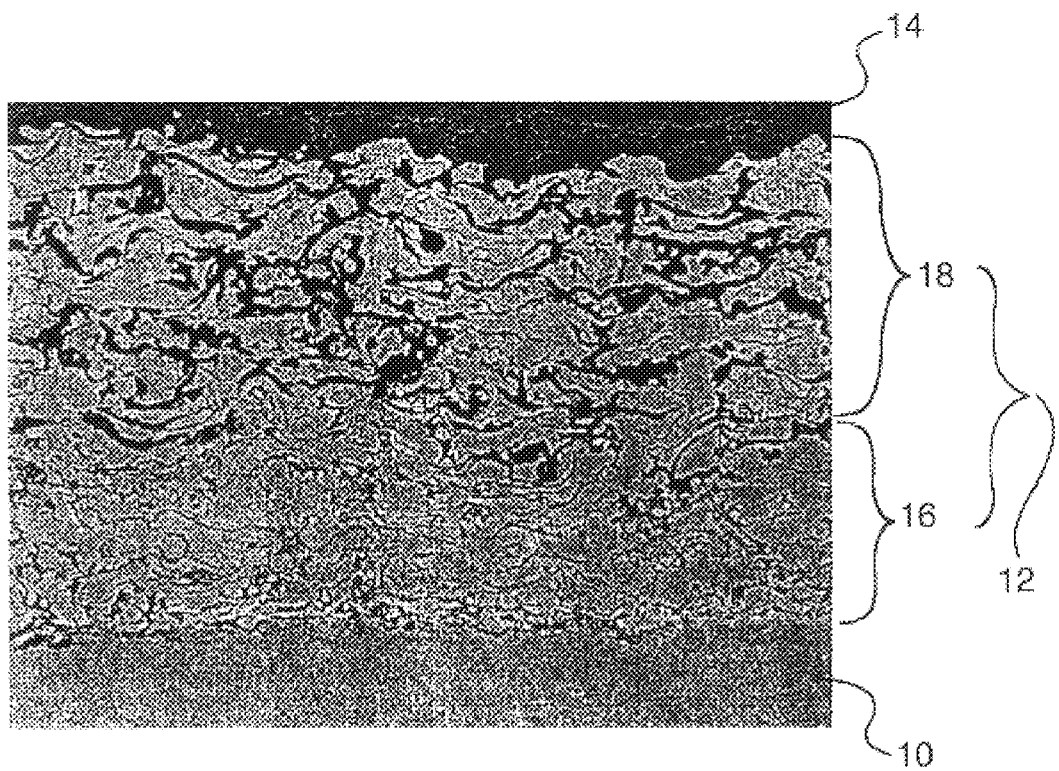
FIG. 2 is a cross-sectional photomicrograph of the example illustrated in FIG. 1, after heat cycling.

The sample was then subjected to furnace cycle testing (FCT) in air. Particularly, the sample was placed in a bottom loading furnace, heated to 2000° F. in approximately 10 minutes, held for 45 minutes, and then forced-air cooled to approximately 200° F. After 200 of these thermal cycles, the sample was inspected. The microstructure at this particular stage in the cycling is shown in FIG. 2. As shown, the distinction between the oxidation-resistant region 16 and the bonding region 18 is clearly shown. The splat lines in the bonding region have been accentuated due to oxidation from exposure to the cycling test. It is believed that such oxidation contributes to a compliance match with the overlying thermal barrier coating. In contrast, the oxidation resistant region showed little or no appreciable further oxidation of the splat lines and the substrate was protected from unwanted oxidation. As observed in FIG. 2, the bonding region has a higher volume percentage of entrained oxide than the oxidation resistant region.

The sample was subjected to additional heat cycling tests, until failure occurred. In comparison to the baseline APS bond coat sample, the improved bond coat sample had markedly superior (3x) resistance to delamination at both the TBC/bondcoat interface and the bondcoat/substrate interface.

Additional examples were then prepared having various braze/MCrAlY ratios, particularly at ratios of 0/100, 25/75, 75/25 and 100/0, on both N5 and Ni413 alloys. Post deposition heat treatments were executed at 2150° F. and at 1975° F. Furnace cycle testing revealed similar durability increases for the N5 and Ni413 samples with the 75:25 braze:NiCrAlY bondcoat chemistry.

According to embodiments of the present invention, an improved thermal barrier coating system is provided. Improved adhesion of the thermal barrier coating to the underlying substrate is maintained by incorporation of a compliant bonding region of a bondcoat. In addition, an oxidation-resistant region of the bondcoat is effective to protect the underlying substrate from oxidation and/or corrosive attack during operation, which otherwise result in delamination. Advantageously, both regions can be deposited using the same technique, such as air plasma spray.

Various embodiments of the invention have been described herein. However, this disclosure should not be deemed to be a limitation on the scope of the claimed invention. Accordingly, various modifications, adaptations, and alternatives may occur to one skilled in the art without departing from the scope of the present claims.

What is claimed is:

1. A turbine engine component comprising:

a substrate;

a bondcoat overlying the substrate, the bondcoat having an oxidation-resistant region and a bonding region overlying the oxidation-resistant region, wherein the oxidation-resistant region comprises a first alloy and a MCrAlY alloy and is formed by thermally co-spraying a first alloy powder and a second alloy powder, the first alloy powder and the second alloy powder being distinct from each other, wherein the first alloy comprises one of a nickel-base and a cobalt-base braze alloy which one of nickel and cobalt is the single greatest element in the braze alloy by weight, wherein M in the MCrAlY alloy is selected from the group consisting of nickel cobalt and combinations thereof, wherein the bonding region is formed by thermally spraying a third alloy powder, and wherein the oxidation-resistant region is more resistant to oxidation than the bonding region; and a thermal barrier coating overlying the bondcoat.

2. The component of claim 1, wherein the oxidation-resistant region is a first layer, and the bonding region is a second layer.

3. The component of claim 1, wherein M is nickel.

4. The component of claim 1, wherein the braze alloy further comprises silicon.

5. The component of claim 4, wherein the braze alloy is nickel-based, and comprises nickel, silicon, and chrome.

6. The component of claim 1, wherein the turbine engine component comprises a superalloy.

7. The component of claim 6, wherein the superalloy is a nickel-base or a cobalt-base superalloy, nickel or cobalt being the single greatest element of the superalloy by weight.

8. The component of claim 1, wherein the thermal barrier coating comprises zirconia.

9. The component of claim 1, wherein the thermal barrier coaxing is in direct contact with the bonding region of the bondcoat.

10. The component of claim 1, wherein the bonding region has a plurality of splat lines, along which an entrained oxide is fanned upon elevated temperature exposure in an ambient containing oxygen.

11. The component of claim 10, wherein the bonding region has a higher volume percentage of entrained oxide than the oxidation-resistant region.

12. A turbine engine component, comprising:

a substrate;

a bondcoat overlying the substrate, the bondcoat having an oxidation-resistant region comprising thermally co-sprayed first and second alloy powders, and a bonding region overlying the oxidation-resistant region and comprising a thermally sprayed third alloy powder, wherein the oxidation-resistant region is more resistant to oxidation than the bonding region, the first and third alloy powders comprise NiCrAlY alloy, and the second alloy powder comprises a braze alloy including nickel, silicon, and chrome; and a thermal barrier coating overlying the bondcoat.

* * * * *